June 21, 1955 H. Z. MARX 2,711,466
MACHINE FOR MAKING AND ATTACHING ELECTRIC TERMINALS
Filed Oct. 9, 1951 7 Sheets-Sheet 1

INVENTOR.
HARRY Z. MARX
BY Edward M. Apple
ATTORNEY

June 21, 1955  H. Z. MARX  2,711,466

MACHINE FOR MAKING AND ATTACHING ELECTRIC TERMINALS

Filed Oct. 9, 1951  7 Sheets-Sheet 3

Fig. 4

INVENTOR.
HARRY Z. MARX
BY *Edward M. Apple*
ATTORNEY

June 21, 1955

H. Z. MARX 2,711,466

MACHINE FOR MAKING AND ATTACHING ELECTRIC TERMINALS

Filed Oct. 9, 1951

INVENTOR.
HARRY Z. MARX
BY Edward M. Apple
ATTORNEY

Fig.16

# United States Patent Office 2,711,466
Patented June 21, 1955

2,711,466

MACHINE FOR MAKING AND ATTACHING ELECTRIC TERMINALS

Harry Z. Marx, Dearborn, Mich.

Application October 9, 1951, Serial No. 250,457

8 Claims. (Cl. 219—4)

This invention relates to a machine and method for forming and attaching a terminal to the end of an electric wire. Machines and processes heretofore known to the public for attaching terminals to electric wires have had certain inherent shortcomings and presented difficulties which up to the present time have not been overcome.

For example, one of the earliest widely accepted processes for making such assemblies was to first fabricate the terminal in a compound die then stake or clinch the terminal onto the insulation of the wire, after which the terminal was soldered in place to effect the electrical connection. Very often "cold" or improper joints resulted. The soft solder introduces resistance into the joint and the flux and acid necessary in soldering processes oftentimes corrodes the insulation and the use of soldering acid presents an industrial hazard.

Another method heretofore employed was the prefabricating of the terminals which are then staked onto the end of a stripped wire so that the two conductors come in direct physical contact. The collection of oxides between the elements and the arcing in the joint area present difficulties which are hard to overcome especially with conductors carrying the higher voltages.

The third method presently in use is to form the terminals in a progressive die which clinches the terminal onto the insulation of the wire simultaneously with the cutting off operation. The terminal is then soldered to the wire in a separate operation with the same objectionable features being presented as outlined above.

A further development introduced the art of resistance welding in attaching the terminals to the wire. In the latter method when proper joints are made the metals in both the wire and the terminal become one homogeneous mass and obviate many of the objectionable features inherent in the other processes. Certain experiments were made by others in the last mentioned field and to my knowledge, at least one assemblage of conventional machines was made for the purpose of practicing such a process.

The results of such experiments were not satisfactory because in that process it necessitated carrying the work pieces from one machine to the other. There was no continuity of action and neither the machine nor the operations were integrated and material handling difficulties were encountered, particularly when it was attempted to attach the terminals to long wires.

It is therefore an object of this invention to obviate the foregoing difficulties and others, and to provide a method and machine for progressively and continuously manufacturing a complete terminal and wire assembly.

Another object of the invention is to provide a method and an integrated semi-automatic machine for continuously manufacturing a terminal and attaching and welding it to an electric wire.

Another object of the invention is to provide a machine with a multiple station die having a section therein in which are positioned certain elements of a resistance welding machine.

Another object of the invention is to provide a hydraulically operated machine which is capable of accomplishing a great plurality of strokes in a comparatively brief period of time.

Another object of the invention is the provision of a machine which is provided with a timing mechanism adapted to effectively and sensitively control and actively inter-relate the hydraulic and welding circuits whereby a dwell of predetermined duration is effected on each stroke of the machine so that sufficient time elapses to permit an effective welding operation.

Another object of the invention is to provide a machine of the character indicated, which is provided with a feeding mechanism integral with the die, and arranged so that the stock is moved forward upon the upstroke of the machine.

The foregoing and other objects and advantages of the invention will appear as the description proceeds, reference being made from time to time to the accompanying drawings forming a part of the within disclosure, in which drawings.

Referring now more particularly to the drawings, it will be understood that in the embodiment herein disclosed, the reference character 21 indicates a base for supporting the press head and die, and other parts hereinafter described. Secured by any suitable means to the side of the base 21 are brackets 22, which are adapted to support the reel 23 which is carried by the spindle 24 which rotates in the U-shaped bearing blocks 25 carried by the brackets 22. The reel 23 carries the flat ribbon stock 26 from which terminals are fabricated. The reference character 27 indicates a bundle of electrical conductors each of which has been pre-stripped at either end and to which it is intended to affix by staking and welding a terminal fabricated from the stock 26.

Figure 14:
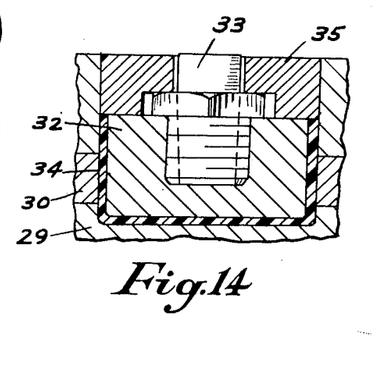
Fig. 14 is a section taken substantially on the line 14—14 of Fig. 2.
Figure 15:
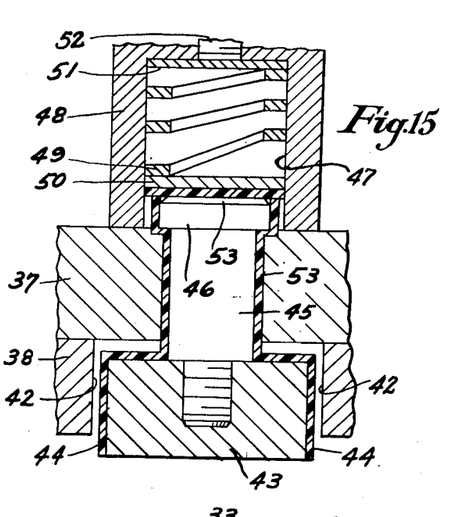
Fig. 15 is a section taken substantially on the line 15—15 of Fig. 2.

Mounted on the top of base 21 is a bolster plate 28 which supports the lower die shoe 29, the die plate 30 and the stripper 31. The die shoe (Fig. 3) also supports the conductor 32 which supplies the welding current to the lower electrode 33 of the welding machine. The conductor 32 is insulated as at 34 from the die shoe 29 and the die plate 30 (Fig. 14). Insulation blocks 35 are also provided above the conductor 32 and provide a flush surface on either side of the electrode 33 for the travel of the stock 26 across the electrode 33. Guide pins 36 extend into openings formed in the die shoe 29 and serve to maintain the alignment of the upper and lower halves of the die. The reference characters 37 and 38 respectively designate the upper die shoe and the punch plate which are supported at the end of the piston rod 39 which reciprocates in the hydraulic cylinder 40 which is supported in the head 41 which in turn is carried by the base 21. The upper die plate 38 has a cut-out portion 42 (Figs. 3 and 15) in which is adapted to reciprocate the upper conductor 43 of the welding machine, the conductor 43 being insulated, as at 44, from its surrounding elements. The conductor 43 (Fig. 15) is suspended from the upper die shoe 37 by means of a shoulder screw 45 which extends through the die shoe 37. The head 46 of the shoulder screw 45 is positioned in a spring pocket 47 formed in a housing 48 which is secured by any suitable means on top of the upper die shoe 37. A compression spring 49 is positioned between the steel washers 50 and 51. The pressure on the spring 49 is applied by a set screw 52 which is threaded into an opening formed at the top of the housing 48. The shoulder screw 45 and the washer 50 are insulated from the surrounding members by means of insulation 53. The conductor 43 (Fig. 17) carries the electrode 54 and is connected by means of a flexible copper conductor 55 to a bus bar 56 which in turn is connected to the secondary winding 57 of the welding transformer. This secondary winding is of special construction and is fully disclosed in U. S. Patent #2,553,665. The other side of the secondary winding 57 is connected to a bus bar 58 which in turn connects to the lower conductor 32 to complete the secondary circuit of the welding machine. It will be understood that the transformer has a primary winding 59 and an iron core 60 and is cooled as in conventional practice by means of the water tubes 61, 62, and 63.

Figure 17:
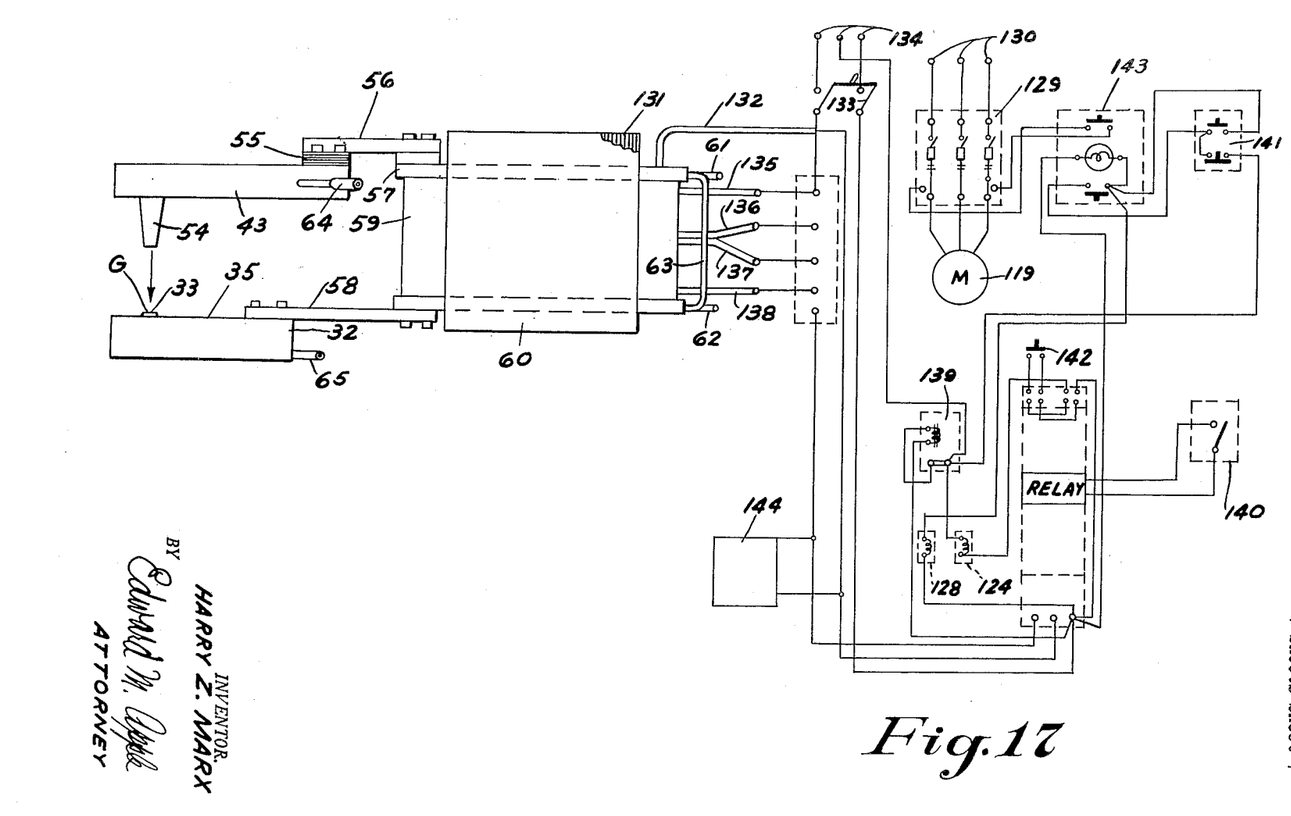
Fig. 17 is a diagrammatic view illustrating the welding transformer and the electric control employed with the device.

The conductors 32 and 43 are likewise cooled by suitable water tubes 64 and 65 (Fig. 17). It will be understood that the conductors 32 and 43 and the electrodes 33 and 54 are arranged in a predetermined position in the die sections and function as one of the intermediate stations of a multiple station die. This is one of the important features of the invention.

I will hereinafter describe the other stations of the die in their relation with the progressive formation of the terminal from the ribbon stock 26 and the feeding mechanism by advancing the ribbon stock through the several stations of the die.

Figure 2:
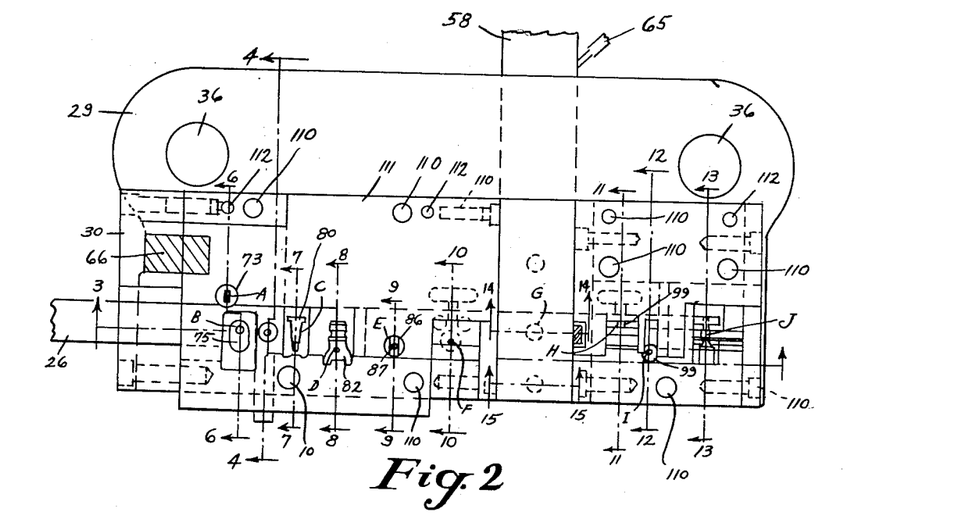
Fig. 2 is a section taken substantially on the line 2—2 of Fig. 1.
Figure 3:
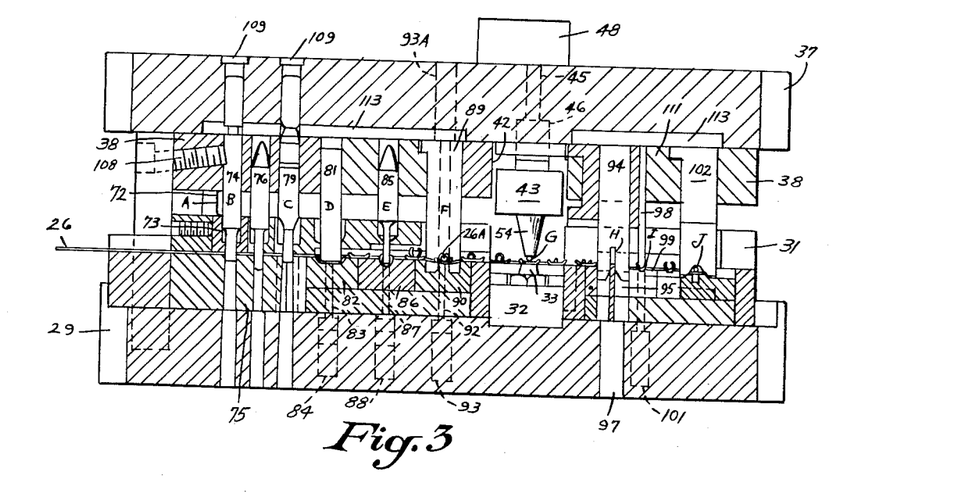
Fig. 3 is a section taken substantially on the line 3—3 of Fig. 2.
Figure 5:
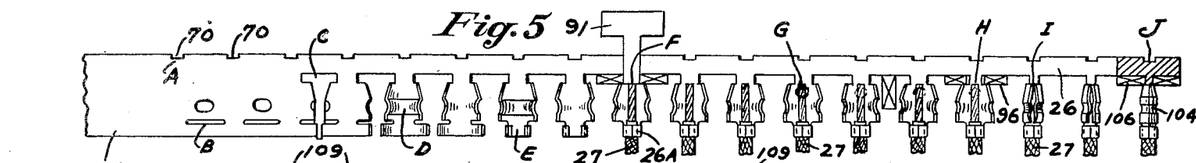
Fig. 5 is a plan view of a strip of stock showing the development and the formation of the terminal, its attachment to the wire, and the final form and cut off.

In Figs. 2, 3, and 5 I illustrate the progressive movement of the stock 26 through the multiple station die from the time that the stock 26 enters the die until the completion of the formation of the terminal, it being welded to the wire lead and it being cut off from the strip stock at the opposite end of the die.

In order to automatically feed the stock 26 into the several working stations of the die, I provide a feeding mechanism which is constructed as follows:

Secured to the upper die shoe 37 is a cam member 66 (Fig. 4) which is provided with an angular face 67 which is adapted to strike a slide 68 having a finger 69 thereon adapted to engage a notch 70 (Fig. 5) formed along the marginal edge of the stock 26. The finger 69 is spring loaded as at 69A. This notch 70 is formed at station A of the die after which the stock is manually moved forward to a position shown in Figs. 2 and 4 so that the notch 70 may be engaged by the drive finger 69. In order to prevent stock from moving backwardly, I provide a slide 71 which is spring backed as at 71A which engages the slot 70 immediately after it is released from the finger 69. Thereafter the stock 26 is moved forward automatically by the engagement of the feed finger 69 with the slots 70.

There are in all ten working stations in this machine which are indicated by the letters A to J inclusive. It is understood that a die with any number of stations required to do the work may be employed.

I will now describe what takes place at each station of the die in this machine.

Figure 6:
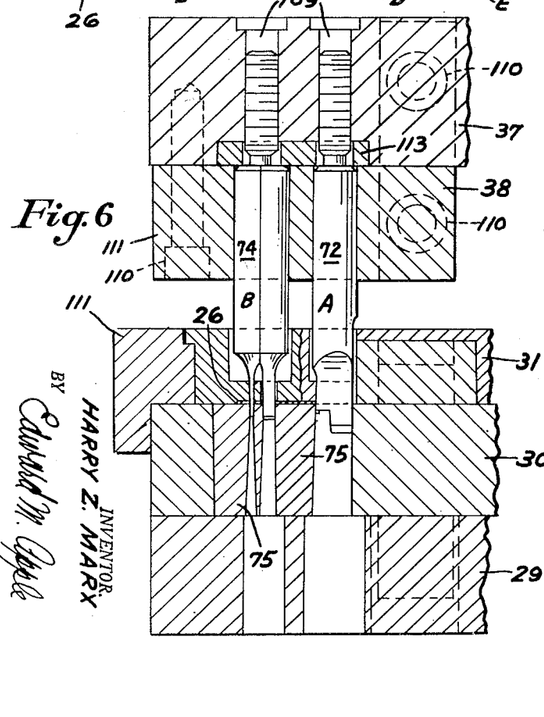
Fig. 6 is a section taken substantially on the line 6—6 of Fig. 2.
Figure 7:
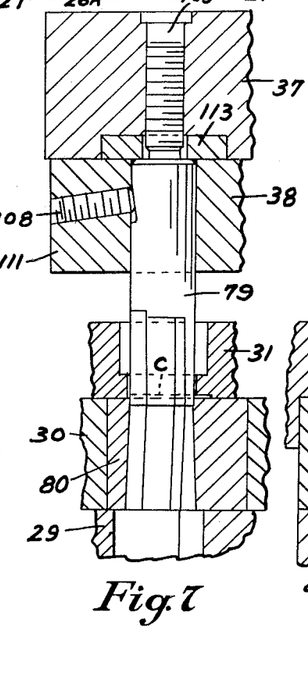
Fig. 7 is a section taken substantially on the line 7—7 of Fig. 2.

At station A the stock 26 is notched along the edge as at 70 (Fig. 5) by means of the punch 72 (Figs. 3 and 6) which engages the die 73 (Figs. 2 and 6).

Figure 4:
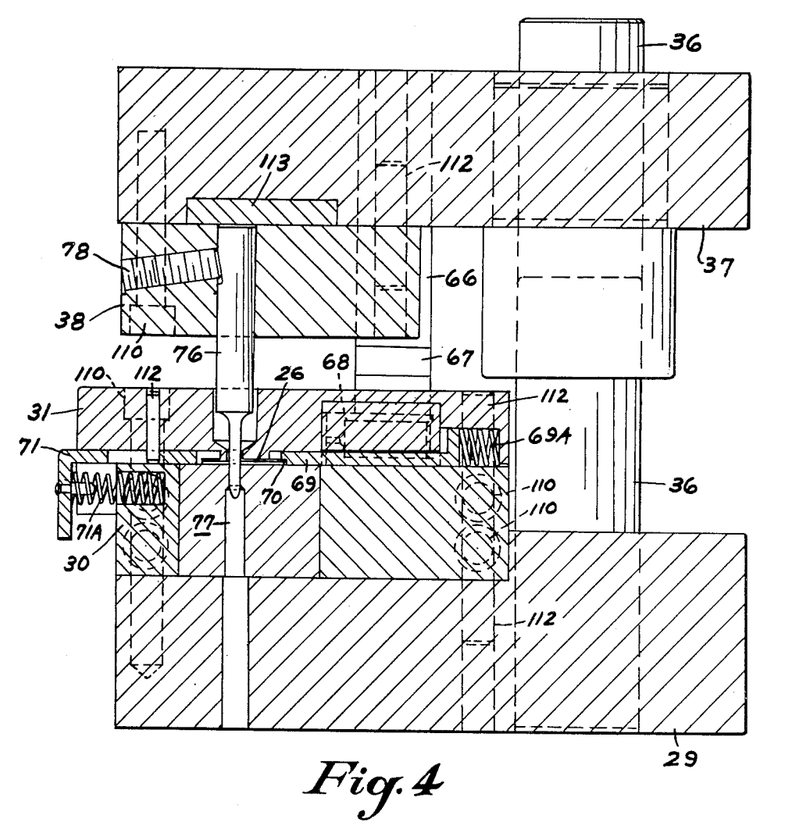
Fig. 4 is a section taken substantially on the line 4—4 of Fig. 2.

At station B the stock 26 is pierced by means of the punch 74 (Figs. 2, 3, and 6) which engages the die 75 (Figs. 2, 3, and 6). The element 76 (Figs. 3 and 4) is a locating punch which engages the die 77 (Figs. 2, 3, and 4). The purpose of the locating punch 76 is to hold the stock 26 in proper alignment while the piercing and blanking operations are performed. The punch 76 is retained as in general practice by means of the set screws 78 (Fig. 4).

At station C (Figs. 2, 3, 5, and 7) the punch 79 engages the die 80 to blank the stock 26 preparatory to the first forming operation at station D.

Figure 8:
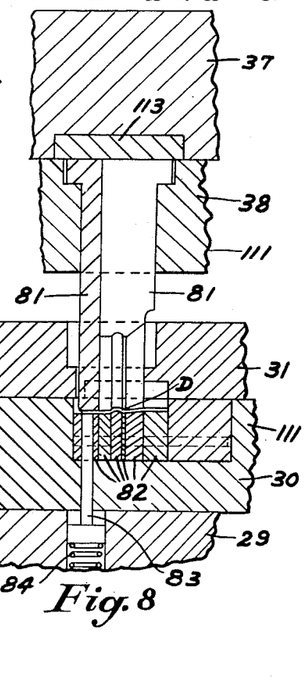
Fig. 8 is a section taken substantially on the line 8—8 of Fig. 2.

At station D (Figs. 2, 3, 5, and 8) the punch 81 engages the die 82 which is a laminated section as shown in Fig. 8, to perform the first forming operation on the stock 26. Upon the retraction of the punch 81 a stripper pin 83, actuated by the spring 84, strips the stock 26 from the die 82 so that the stock may be advanced to the next station.

At station E (Figs. 2, 3, 5, and 9) the punch 85 engages the die 86 to make the second form on the stock 26. Upon the retraction of the punch 85, a stripper pin 87, actuated by the spring 88, strips the stock 26 from the die 86 to permit it to move to the next station.

Figures 9, 10, 11:
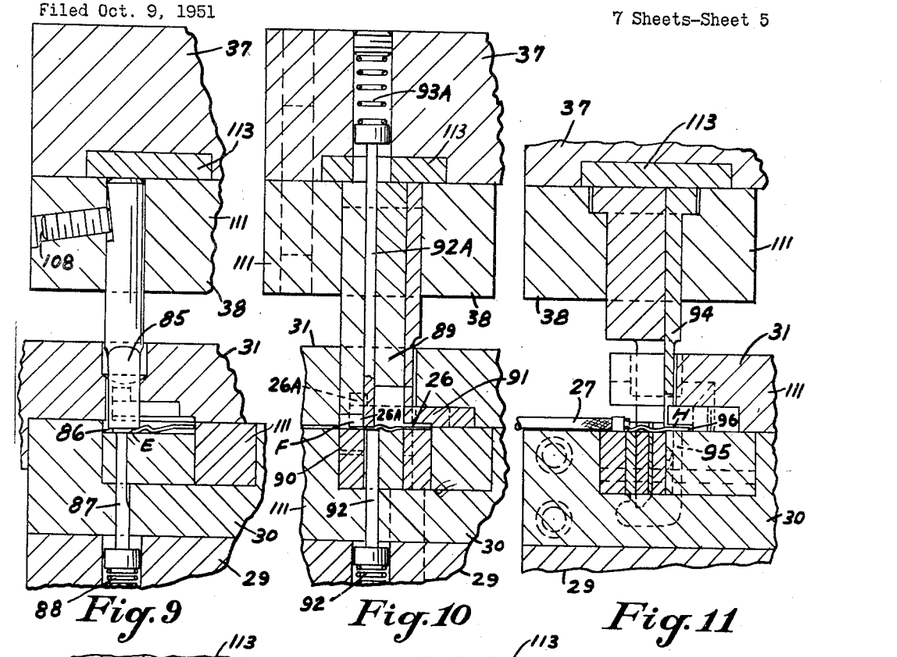
Fig. 9 is a section taken substantially on the line 9—9 of Fig. 2.
Fig. 10 is a section taken substantially on the line 10—10 of Fig. 2.
Fig. 11 is a section taken substantially on the line 11—11 of Fig. 2.
Figure 12:
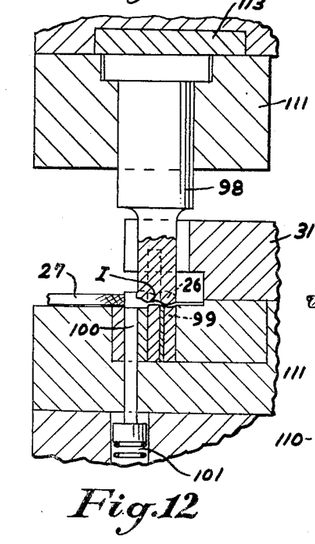
Fig. 12 is a section taken substantially on the line 12—12 of Fig. 2.

At station F (Figs. 2, 3, 5, and 10) one of the prestripped wire leads 27 is manually inserted into the die 90 where the punch 89 engages the die 90 staking the ears 26A (Figs. 3, 5, and 10) of the stock 26 around the insulation of the wire 27. The insertion of the wire lead 27 into the die 90 is controlled by a wire stop 91 (Figs. 5 and 10). After the lead is staked onto the wire 27, the stripper pins 92 and 92A, actuated by the springs 93 and 93A, strip the stock 26 and the wire 27 affixed thereto from the die 90 and the punch 89 permitting the stock 26 to move to the next station.

At station G the welding operation is performed by bringing into contact the upper electrode 54 with the stripped wire 27, and forcing the stock 26 against the lower electrode 33, at which time the welding circuit is energized, as hereinafter described, welding the stripped wire of the lead 27 to the stock 26, after which the stock is advanced to the next station.

At station H (Figs. 2, 3, 5, and 11) the punch 94 engages the die 95 to trim out a portion of the stock 26, as at 96 (Figs. 5 and 11). The stock 96 which is trimmed off of the strip 26 drops out through the slug clearance 97 (Fig. 3).

At station I (Figs. 2, 3, 5 and 12) the punch 98 engages the die 99 to further form the stock 26 around the stripped and welded portion of the wire 27. Upon the withdrawal of the punch 98 from the die 99, the stripper pin 100, actuated by the spring 101, strips the stock from the die 99 permitting the stock to move to the next station.

Figure 13:
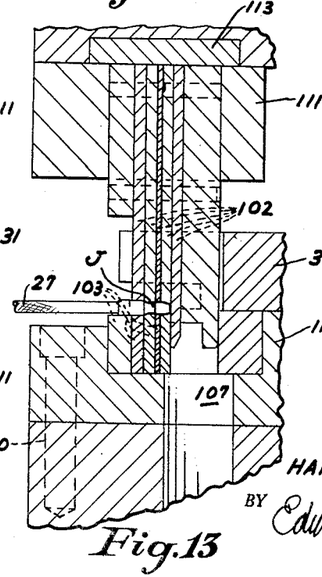
Fig. 13 is a section taken substantially on the line 13—13 of Fig. 2.

At station J the final forming and cut off of the stock 26 takes place. The punch 102 engages the die 103, which is also a laminated section, finally forming the stock 26 around the welded wire 27 to form a complete bullet terminal as at 104 (Figs. 5 and 13). At the same time, the terminal 104 is cut from the remainder of the carrier strip of the stock 26 and trims off the portions 106 (Figs 5) of the strip which drop as scrap through the slug clearance opening 107 (Fig. 13).

It will be understood that each stroke of the press clears one of the operations indicated by the lettered stations A through J. The stock 26 continues to progress through the die and the operations just described are repeated thereon. This continues as long as stock 26 is fed and the machine is operated, there being a complete assembly produced at the end of the die with each stroke of the machine.

It will be understood that each of the punches hereinabove described is secured in position by conventional lock screws or set screws as at 108. The punches 72, 74 and 79 are adjustable by means of adjusting screws, as at 109 (Figs. 2, 3, 6 and 7). It will also be understood that the dies and punches hereinabove described are conventionally secured in position by means of cap screws 110, retainer plates 111, dowel pins 112, and plates 113.

Figure 16:
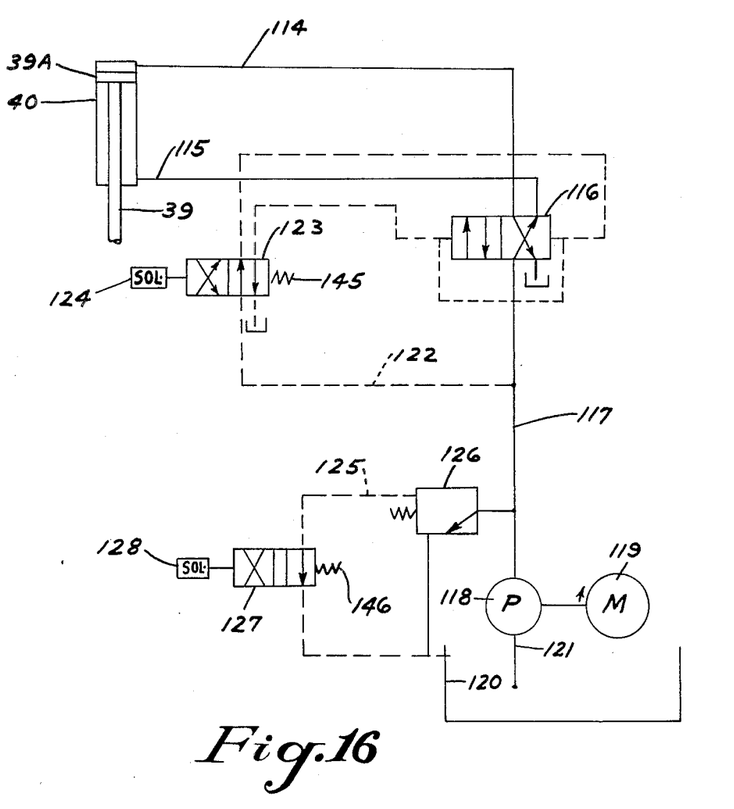
Fig. 16 is a diagrammatic view of the hydraulic circuit employed with the machine.

The mechanism heretofore described is actuated and controlled as follows:

The upper die shoe 37 is reciprocated by means of the piston rod 39 carried at the end of the piston 39A which reciprocates in the cylinder 40 and is motivated by the hydraulic power which is carried through the hydraulic lines 114 and 115 (Figs. 1 and 16) which connect through a conventional hydraulic four way control valve 116, which in turn communicates through the hydraulic line 117 with the pump 118 which is driven by the electric motor 119. The pump 118 communicates with a hydraulic reservoir 120 through the line 121. The hydraulic line 117 has an auxiliary circuit 122 which is arranged to control the up and down movement of the piston 39A. The hydraulic circuit 122 is controlled by a valve 123 which in turn is actuated by a solenoid 124. The hydraulic line 117 has a second auxiliary circuit 125 in which is positioned the spring actuated by-pass valve 126 and a valve 127 which is actuated by a solenoid 128. The purpose of the auxiliary hydraulic circuit 125 is to enable me to maintain a constant high pressure in the line 117 and eliminate the necessity of waiting for a build up through the hydraulic pump 118. This is an important feature of the invention as it enables me to obtain a quick stroke of the upper die shoe without the customary time lag occasioned in building up the high pressure in the cylinder 40.

Figure 1:
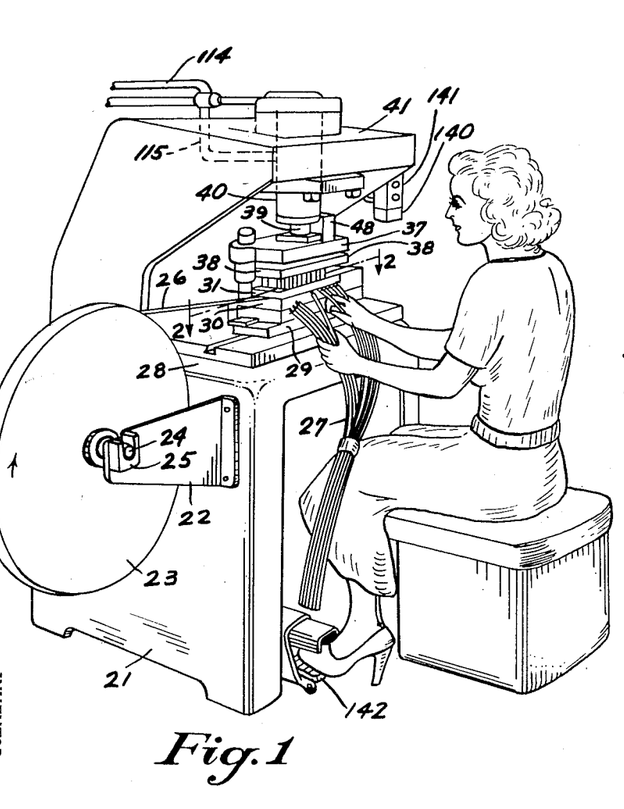
Fig. 1 is a perspective view of a device embodying the invention less the hydraulic power unit, with an operator in attendance.

The motor 119 and the solenoids 124 and 128 are connected into the electric circuit shown in Fig. 17 and function as hereinafter described. The electric motor 119 which actuates the hydraulic circuit is connected through a motor starter 129 which in turn is connected through the leads 130 to a power supply (not shown). The welding transformer 131 is connected through the primary lead 132 to a switch 133 which in turn is connected through the leads 134 to a conventional source of power (not shown). The transformer 131 is tapped as at 135, 136, 137 and 138 so that the energy supplied can be varied. The cooling system 61, 62 and 63 is controlled by means of a solenoid operated valve 139. The welding circuit is controlled by another switch 140 which is positioned within easy reach of the right arm of the operator as shown in Fig. 1. A start and stop switch 141 is also positioned within easy reach of the operator as shown in Fig. 1. Another switch 142 is positioned to be actuated by the foot of the operator as shown in Fig. 1 and has for its purpose the general control of the operating cycle of the machine. This switch must be depressed at all times in order to keep the machine in continuous operation. A second operating switch (not shown) is also provided so that a single cycle may be controlled.

A conventional time delay relay 143 is positioned in the electrical circuit as shown in Fig. 17, so that pressure maintained in the line 117 may be quickly released by the valve 127 by de-energizing the solenoid 128. The relay 143 remains energized for a predetermined period of time when the relay 143 is de-energized stopping the flow of current to the motor 119. I also provide in the circuit as at 144 a conventional weld sequence timer which controls the time consumed by the down travel of the upper die shoe 37, times the flow of the welding current, times the upward travel of the upper die shoe 37 and the interval of time between strokes, and also enables me to operate the machine optionally on single or repeat cycles.

This is an important element in the device, inasmuch as it enables me to provide a proper dwell and maintain pressure on the welding electrodes during the flow of the welding current. This also permits me to very precisely control the dwell at either the upper or lower end of the stroke and permits the welding operation as one of the stations in the multiple station die. It also provides sufficient time at the top of the stroke for the operator to manually feed the wire 27 to the die.

I will now describe a typical operating cycle of this machine.

Assuming that the stock 26 is on the reel 23 and the end thereof is manually fed into the first station of the die. The operator then presses the start button 141. This energizes the starter 129 which in turn starts the motor 119 driving the pump 118 to develop fluid pressure in the line 117. At the same time, the solenoid 128 is energized actuating the valve 127 which in turn actuates the valve 126 creating a high pressure in the line 117. In order to start the operation of the machine, the foot switch 142 is then actuated. This energizes the solenoid 124 which actuates the valve 123 and the valve 116 to permit the flow of hydraulic fluid to the line 114 to the top of the cylinder 40, whereby the piston 39A and the piston rod 39 and the upper die shoe 37 are started downwardly, at the same time setting the first relay in the timer 144 for a predetermined length of time.

At the expiration of this time, the first relay in the timer 144 is energized for a predetermined period of time which governs the length of flow of the welding current. At the expiration of this period of time, the second relay is de-energized and the third relay of the timer 144 is energized for a predetermined period of time holding the electrodes 33 and 54 in contact. At the expiration of this time the third relay is de-energized in the timer 144 and the fourth relay in the timer 144 is energized for a predetermined period of time. At the end of this time, the fourth relay is de-energized and in turn de-energizes the solenoid 124 permitting the spring 145 to actuate the valve 123 which in turn actuates the valve 116 to reverse the flow of hydraulic fluid in the line 115 to cause the return of the piston 39A and the upper die shoe 37 to its original position.

This cycle repeats itself so long as the switch in the timer 144 is placed on repeat and the foot switch 142 is depressed. In order to stop the machine entirely, the lower button of the switch 141 is pushed by the operator which de-energizes the solenoid 128 and permits the spring 146 to actuate the valve 127 which in turn opens the valve 126 to permit the release of the pressure in the hydraulic line 117. At the same time, the time delay relay 143 is de-energized putting into operation a pneumatic device for a predetermined period of time at the end of which the current flowing into the switch 129 is interrupted stopping the motor 119.

It is understood that upon each upward stroke of the upper die shoe 37 the cam 66 of the feeding mechanism actuates the slide 68 engaging the feed finger in the slot 70 and advancing the stock one station.

Although I have herein disclosed the method of forming and attaching a terminal to a wire by means of apparatus which includes a multiple station die, it is conceivable that the forming of the terminal may be accomplished with a rolling machine, or another type of a bending machine and conventional cut off equipment, other than a cut off die, all of which is within the contemplation of this invention, and is in support of the method claims hereto appended.

Having described my invention, What I claim and desire to secure by Letters Patent is:

1. A machine for automatically forming and attaching a terminal to a wire, comprising a punch press, hydraulic power means for actuating said press, a multiple station die in said press, means to continuously feed a strip of stock to said die, said die having in sequence one or more stations for partly forming a terminal on said strip, an intermediate station for welding the partly formed terminal to a wire inserted into the side of said die, said welding station comprising electrodes secured to each of the shoes of said die, one or more stations for final forming the terminal, and a station for cutting off the terminal from said strip stock.

2. The structure of claim 1, including an electric welding circuit connected to said welding station, and co-operating electric circuits for controlling said hydraulic power means and timing said welding circuit.

3. In a device of the character described, including a power actuated punch press, and control means for said press, in combination with said press, a multiple station die arranged to receive a strip of stock suitable for making electric terminals, stock feeding elements on said die, one or more terminal pre-forming stations in said die, an intermediate welding station in said die, said station comprising a pair of electrodes each one of which is secured to one of the shoes of said die, a welding circuit connected to said welding station, final terminal forming stations following said welding station, a cut off station in said die, and means for controlling said welding circuit.

4. In combination with a punch press, upper and lower die sections constructed and arranged to provide a plurality of progressive working stations, an electrode of a welding machine carried by each of said die sections, and arranged as one of the intermediate working stations of said die, a welding circuit connected to said electrodes and insulated from said die sections, power means for actuating said press, and electric control means for said power means and said welding circuit.

5. The combination of claim 4, including means for feeding terminal forming stock into said die and moving it past each of said working stations, and an element on said lower die section arranged to serve as a stop for an electric wire fed to said lower die section at one of said working stations.

6. In a device of the character described in combination, a punch press, hydraulic power means for actuating said press, electric control means for said power means, upper and lower die sections having stations for forming a terminal from stock and attaching it to a wire carried by said press, a welding machine having its electrodes carried as a station in said die sections and having its transformer connected to the electrodes carried by said upper and lower die sections, and electric control means for said welding machine connected to said first named control means.

7. The combination of claim 6, in which said die sections define a plurality of progressive work stations one of said stations having means for receiving a wire, a wire in said receiving means, one of said work stations consisting of said welding electrodes at which station the terminal is welded to the wire, another of said work stations being constructed and arranged to final form the terminal stock being worked upon, and to cover the wire in the area contacted by said electrodes.

8. The combination of claim 6, in which said die sections define a plurality of progressive work stations one of said stations having means for receiving a wire, a wire in said receiving means, said last work station having means associated therewith for limiting the entry of the wire inserted therein, another of said work stations consisting of said welding electrodes at which station the said terminal is welded to said wire, another of said work stations being constructed and arranged to final form the terminal stock being worked upon, and to cover said wire at the point contacted by said electrodes.

References Cited in the file of this patent

UNITED STATES PATENTS

| | | |
|---|---|---|
| 1,873,125 | Holmes et al. | Aug. 23, 1932 |
| 1,959,150 | Basch et al. | May 15, 1934 |
| 1,976,929 | Elliott | Oct. 16, 1934 |
| 2,116,269 | Kobzy | May 3, 1938 |
| 2,169,802 | Keller | Aug. 15, 1939 |
| 2,288,348 | Funk | June 30, 1942 |
| 2,329,769 | Kinyon | Sept. 21, 1943 |
| 2,339,884 | Schlumpf | Jan. 25, 1944 |
| 2,476,187 | Gordon | July 12, 1949 |
| 2,477,859 | Burge et al. | Aug. 2, 1949 |
| 2,477,894 | Pityo | Aug. 2, 1949 |
| 2,631,213 | Martines | Mar. 10, 1953 |